US008974233B2

(12) United States Patent
Asakura et al.

(10) Patent No.: US 8,974,233 B2
(45) Date of Patent: Mar. 10, 2015

(54) ROTARY CONNECTOR

(71) Applicant: Alps Electric Co., Ltd., Ota-ku, Tokyo (JP)

(72) Inventors: Toshiaki Asakura, Toyko (JP); Keisuke Aikawa, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 50 days.

(21) Appl. No.: 13/951,044

(22) Filed: Jul. 25, 2013

(65) Prior Publication Data

US 2014/0051267 A1   Feb. 20, 2014

(30) Foreign Application Priority Data

Aug. 20, 2012 (JP) .................................. 2012-181610

(51) Int. Cl.

| H01R 39/00 | (2006.01) |
|---|---|
| B60R 16/027 | (2006.01) |
| H01R 35/04 | (2006.01) |
| H01R 13/652 | (2006.01) |
| H01R 39/64 | (2006.01) |
| H01R 35/02 | (2006.01) |

(52) U.S. Cl.
CPC .............. *B60R 16/027* (2013.01); *H01R 35/04* (2013.01); *H01R 13/652* (2013.01); *H01R 39/643* (2013.01); *H01R 35/025* (2013.01); *H01R 35/02* (2013.01); *H01R 39/64* (2013.01); *H01R 2201/26* (2013.01)
USPC ................................ 439/15; 439/64; 439/164

(58) Field of Classification Search
CPC ........ H01R 35/025; H01R 35/04; H01R 39/00; H01R 39/64; H01R 2103/00; H01R 39/643; H01R 13/652; H01R 35/02; H01R 2201/26
USPC .................................. 439/15, 16, 164, 13, 64
See application file for complete search history.

(56) References Cited

U.S. PATENT DOCUMENTS 5,259,775 A * 11/1993 Kubota et al. ................. 439/164

FOREIGN PATENT DOCUMENTS

| JP | 8-280127 | 10/1996 |
|---|---|---|
| JP | 2006-086043 | 3/2006 |

* cited by examiner

*Primary Examiner* — Abdullah Riyami
*Assistant Examiner* — Thang Nguyen
(74) *Attorney, Agent, or Firm* — Hunton & Williams LLP

(57) ABSTRACT

In a rotary connector where a moving body turning with the rotation and revolution of planetary gears and flat cables including inverted portions at middle portions thereof are received in a receiving space between outer and inner cylindrical bodies, a bottom plate of a stationary-side housing is provided with an annular protrusion that comes into contact with lower surfaces of the planetary gears and a hollow portion that is positioned outside the annular protrusion in a radial direction, and the hollow portion is positioned directly below in a vertical direction when the stationary-side housing is mounted on an installation portion of a vehicle. Accordingly, a foreign matter entering the receiving space falls down onto the bottom plate and is accumulated in the hollow portion. Therefore, the hindrance to the rotation of the planetary gears, when the planetary gears catch a foreign matter, can be prevented.

2 Claims, 9 Drawing Sheets

ROTARY CONNECTOR

CLAIM OF PRIORITY

This application contains subject matter related to and claims the benefit of Japanese Patent Application No. 2012-181610 filed on Aug. 20, 2012, the entire contents of which is incorporated herein by reference.

BACKGROUND OF THE DISCLOSURE

1. Field of the Disclosure

The present disclosure relates to a rotary connector that is assembled with a steering device of an automobile and is used as electrical connection means of an air bag system, and more particularly, to a rotary connector where a flat cable is reversely wound through an inverted portion of the flat cable in an receiving space defined between a stationary-side housing and a movable-side housing.

2. Description of the Related Art

A rotary connector is a connector in which a stationary-side housing including an outer cylindrical body and a movable-side housing including an inner cylindrical body are rotatably disposed coaxially with each other and flat cables are received and wound in a receiving space defined between the outer cylindrical body and the inner cylindrical body, and is used as electrical connection means of an air bag inflator that is mounted on a steering wheel, such as a steering device of an automobile, of which the number of times of rotation is finite. The flat cable is a strip-shaped body in which a conductor is supported on an insulating film, and a spiral type in which the flat cable is spirally wound and an inversion type in which the flat cable is wound so as to be inverted at a middle portion thereof have been known. Since the length of the flat cable can be significantly shortened in the latter, that is, the inversion type, it has become more mainstream.

In the related art, a rotary connector where a method of winding a flat cable includes an inversion type as described above, a roller holder in which a guide wall and a plurality of support shafts are erected on a ring-shaped rotating plate is turnably disposed in a receiving space, rollers are rotatably mounted on the respective support shafts of the roller holder, and an inverted portion of the flat cable passes through an opening formed between the guide wall and one roller facing the guide wall (as described in, for example, Japanese Unexamined Patent Application Publication No. 2006-86043). In the rotary connector having such a structure, when the movable-side housing rotates relative to the stationary-side housing in any one direction of a normal direction and a reverse direction, the flat cable is fed from the outer cylindrical body so as to be tightly wound on the inner cylindrical body or, conversely, is fed from the inner cylindrical body so as to be rewound on the outer cylindrical body according to the rotation direction of the movable-side housing. At that time, the inverted portion of the flat cable is moved in the same direction as the direction of the movable-side housing by a rotation angle smaller than the rotation angle of the movable-side housing, the roller holder is also moved in the same direction so as to follow the inverted portion, and the flat cable of which the length is about double the moving distances of the inverted portion and the roller holder is fed from the outer cylindrical body or the inner cylindrical body. That is, the roller holder receives a driving force (a pulling force or a pressing force) from the inverted portion of the flat cable and turns in the receiving space, and the movement of the flat cable in the radial direction is regulated by the plurality of rollers mounted on the roller holder as described above. Accordingly, the flat cable is smoothly fed from the outer cylindrical body and tightly wound on the inner cylindrical body, or is fed from the inner cylindrical body and rewound on the outer cylindrical body.

Further, a conventional rotary connector include a moving body supporting a planetary gear disposed in a receiving space instead of the roller holder and the moving body is rotated at the same speed as the speed of an inverted portion of a flat cable with the rotation (rotation and revolution) of the planetary gear (as described in, for example, Japanese Unexamined Patent Application Publication No. 8-280127). In such a rotary connector, a plurality of rollers are rotatably supported on the surface side of the moving body, and the inverted portion of the flat cable passes through an opening formed between arbitrary rollers. Furthermore, the planetary gear is rotatably supported on the back side of the moving body, and the planetary gear meshes with both an internal gear provided on a stationary-side housing and a sun gear provided on a movable-side housing. In the rotary connector having such a structure, when the movable-side housing rotates relative to the stationary-side housing, the planetary gear meshing with the internal gear and the sun gear rotates at a predetermined reduction gear ratio. Accordingly, the moving body supporting the planetary gear rotates and moves in the receiving space, and the inverted portion of the flat cable also moves in the receiving space at the same speed as the speed of the opening of the moving body.

Since the roller holder receives a driving force (a pulling force or a pressing force) from the inverted portion of the flat cable and turns in the receiving space in the rotary connector in the related art disclosed in Japanese Unexamined Patent Application Publication No. 2006-86043 as described above, suitable stiffness is necessary the flat cable passing through the opening (tensile strength corresponding to stiffness to be described below). For this reason, a flat cable of which the insulating film is thick and which has high stiffness should be used. In contrast, in the rotary connector in the related art disclosed in Japanese Unexamined Patent Application Publication No. 8-280127, it is possible to move the opening of the moving body and the inverted portion of the flat cable at the same speed in the same direction in the annular space by appropriately setting the gear ratio of the respective gears, including the planetary gear. Accordingly, since the moving body does not require a driving force applied from the inverted portion of the flat cable, a flat cable, which uses a thin insulating film, is inexpensive, and has low stiffness, can be used. However, the moving body supporting the planetary gear moves in the receiving space with the rotation of the planetary gear meshing with the internal gear and the sun gear. Accordingly, when a foreign matter, such as dust or sand, enters the receiving space through a clearance that is required at a sliding portion between the movable-side housing and the stationary-side housing, there is a concern that this foreign matter is deposited in the rotary connector and hinders the rotation of the planetary gear. In particular, when hard sand or the like of which the particle size is larger than the particle size of dust has entered the receiving space, such a foreign matter falls down in the receiving space and is likely to be deposited on the bottom plate of the stationary-side housing, for example, in a region below the internal gear. Accordingly, when the planetary gear passes below the internal gear, the planetary gear catches the foreign matter between the respective gears and cannot be rotated. For this reason, there is a problem in that the free rotation of the steering wheel is hindered.

These and other drawbacks exist.

SUMMARY OF THE DISCLOSURE

Embodiments of the disclosure provide a rotary connector of which a movable-side housing can be rotated without being affected by a foreign matter.

According to various embodiments, a rotary connector includes: a stationary-side housing where an outer cylindrical body is erected from an outer peripheral edge of a bottom plate; a movable-side housing that includes an inner cylindrical body facing the outer cylindrical body and is disposed coaxially with the stationary-side housing; flat cables which are received in a receiving space defined between the outer cylindrical body and the inner cylindrical body so that winding directions of the flat cables are reversed at middle portions of the flat cables, and of which both ends are fixed to the stationary-side housing and the movable-side housing, respectively; and a moving body that is turnably disposed in the receiving space and includes openings through which inverted portions of the flat cables pass. Planetary gears supported on a lower surface of the moving body mesh with an internal gear that is provided in the stationary-side housing and a sun gear that is provided in the movable-side housing. The bottom plate of the stationary-side housing is provided with an annular protrusion that comes into contact with lower surfaces of the planetary gears and a recess that is positioned outside the annular protrusion in a radial direction. The recess is positioned at least directly below in a vertical direction when the stationary-side housing is mounted on an installation portion of a vehicle.

When the rotary connector having this structure is assembled into a steering device of an automobile while being used, a foreign matter such as hard sand, which enters the receiving space from the outside, falls down onto the bottom plate of the stationary-side housing and is moved to and accumulated in the recess positioned outside the annular protrusion, which is provided on the bottom plate, in the radial direction due to the vibration of an automobile. Accordingly, the hindrance to the rotation of the planetary gears meshing with the internal gear and the sun gear, which is caused when the planetary gears catch a foreign matter, does not occur. Therefore, since the planetary gears smoothly rotate with the rotation of the movable-side housing and drive the moving body, the steering wheel can be rotated without being affected by a foreign matter.

If the recess provided on the bottom plate includes a first annular recessed groove that is continued along an outer peripheral edge of the annular protrusion and a hollow portion that overlaps the internal gear on the outside of the first annular recessed groove in the radial direction in the above-mentioned structure, a region in which a foreign matter entering the receiving space can be accumulated is enlarged. Accordingly, it is possible to further reduce a possibility that the hindrance to the rotation of the planetary gears, which is caused when the planetary gears catch a foreign matter, occurs.

Further, if the bottom plate is provided with a second annular recessed groove that is continued along an inner peripheral edge of the annular protrusion in the above-mentioned structure, a region in which a foreign matter can be accumulated is enlarged. Accordingly, it is possible to further reduce a possibility that the hindrance to the rotation of the planetary gears, which is caused when the planetary gears catch a foreign matter, occurs. In particular, even though a foreign matter entering the receiving space adheres to the surface of the annular protrusion for some reasons and this foreign matter is pushed back toward the sun gear provided inside the radial direction due to the movement of the planetary gears, it is possible to make the foreign matter fall down onto the second annular recessed groove in front of the sun gear and to accumulate the foreign matter in the second annular recessed groove. Therefore, a concern about the hindrance to the free rotation of the steering wheel, which is caused by a foreign matter, is further reduced.

DETAILED DESCRIPTION OF THE DISCLOSURE

The following description is intended to convey a thorough understanding of the embodiments described by providing a number of specific embodiments and details involving a rotary connector. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
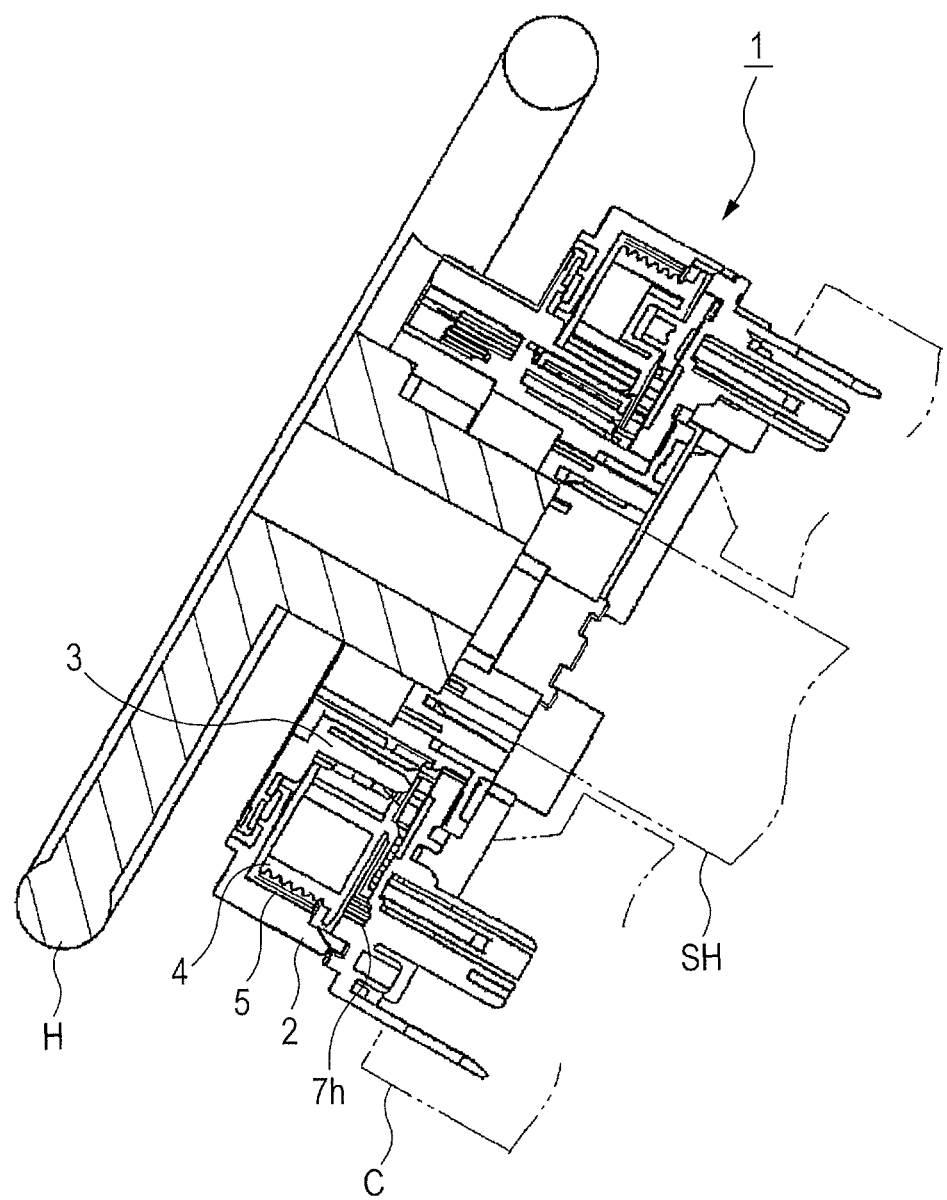
FIG. 1 is a cross-sectional view showing a state in which a rotary connector according to an embodiment of the disclosure is assembled into a steering device.
Figure 2:
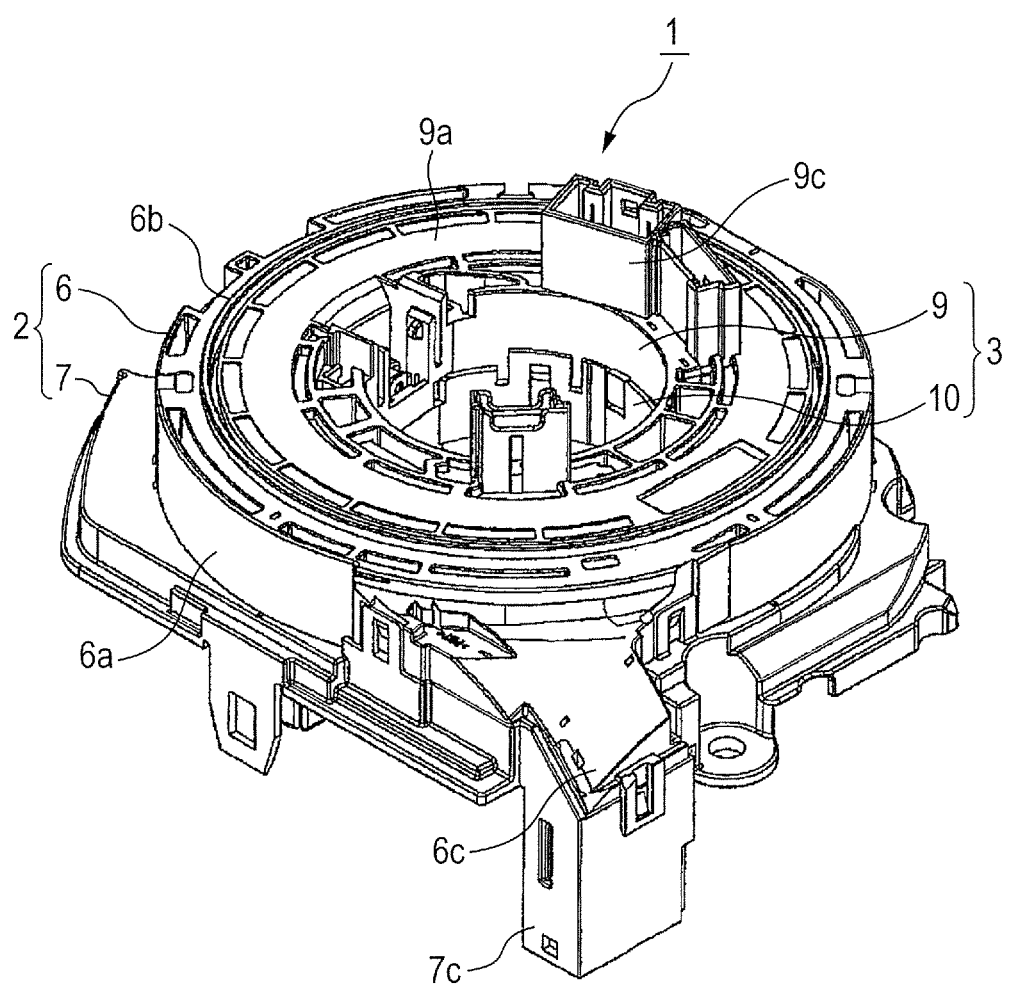
FIG. 2 is a perspective view showing the appearance of the rotary connector according to an embodiment of the disclosure.

The various embodiments of the disclosure will be described below with reference to the drawings. As shown in FIG. 1, a rotary connector 1 may include a stationary-side housing 2, a movable-side housing 3, a moving body 4, flat cables 5, and the like. The rotary connector 1 may be assembled with a steering device of an automobile while being used. The steering device may include, for example, a steering column C as an installation portion, a steering shaft SH that may be inserted into the steering column C and may protrude, a steering wheel H that may be connected to a tip of the steering shaft SH, and the like. The steering wheel H may be provided with an air bag inflator and various switches (not shown). Further, since the stationary-side housing 2 may be fixed to the mounting surface of the steering column C and the steering wheel H may be fixed to the movable-side housing 3, an air bag inflator or the like provided in the steering wheel H may be connected to a controller provided in the steering column C through the flat cables 5 of the rotary connector 1 regardless of the steering angle (rotation angle) of the steering wheel H. Here, since the steering shaft SH is inclined at a predetermined tilt angle as known well, the mounting surface of the steering column C may be inclined so that a lower end portion of the mounting surface of the steering column C is closer to a driver than an upper end portion of the mounting surface when seen from a driver's seat. Accordingly, the rotary connector 1 may be assembled with the steering device so as to be in a backward inclined posture when being used.

As shown in FIGS. 2 to 7, the stationary-side housing 2 may include upper and lower cases 6 and 7 made of a synthetic resin, and both the cases 6 and 7 may be connected to and integrated with each other by snap-fitting. An outer cylindrical body 6a that may have a substantially perfectly circular inner peripheral surface, a ring portion 6b that may protrude inward from the upper end of the outer cylindrical body 6a, and a stationary-side connecting portion 6c that may protrude outward from the outer peripheral surface of the outer cylindrical body 6a may be formed integrally with the upper case 6. Joint portions 15 (see FIGS. 3 to 5), which are to be electrically connected to outer end portions of the flat cables 5 as described below, are provided in a space that is formed when the stationary-side connecting portion 6c is connected to a connector cover 7c to be described below.

Figure 4:
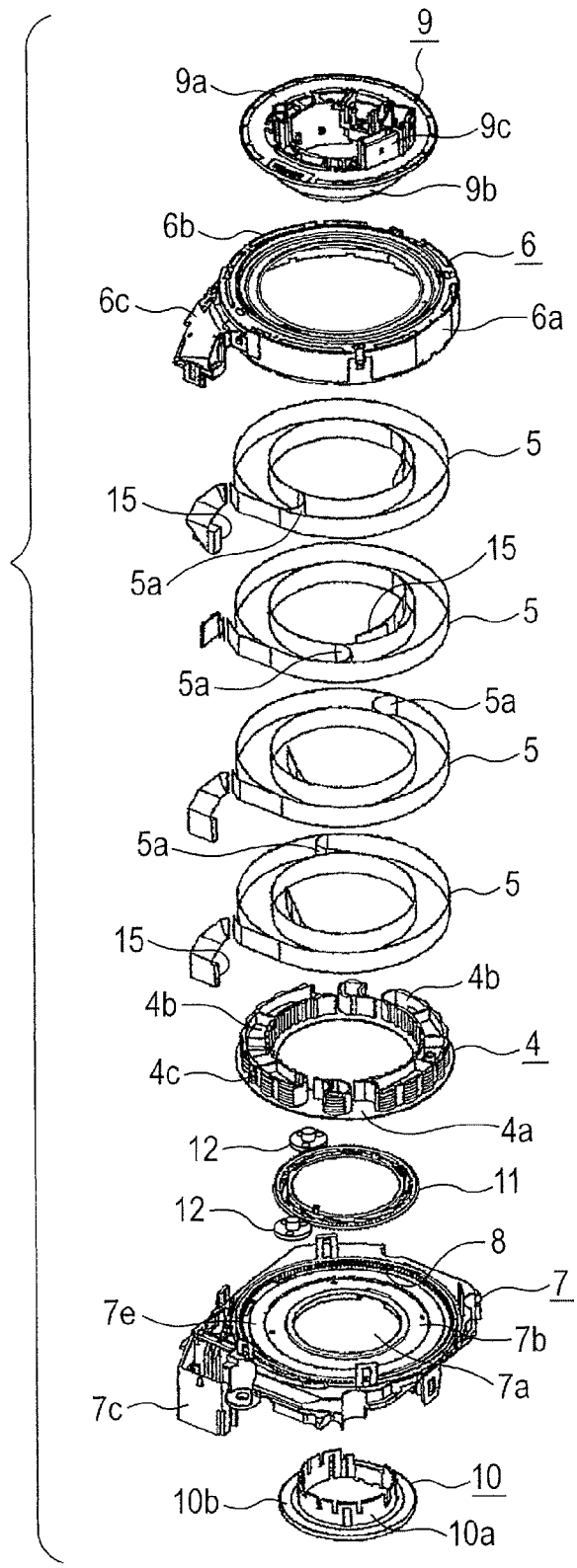
FIG. 4 is an exploded perspective view of the rotary connector according to an embodiment of the disclosure.
Figure 6:
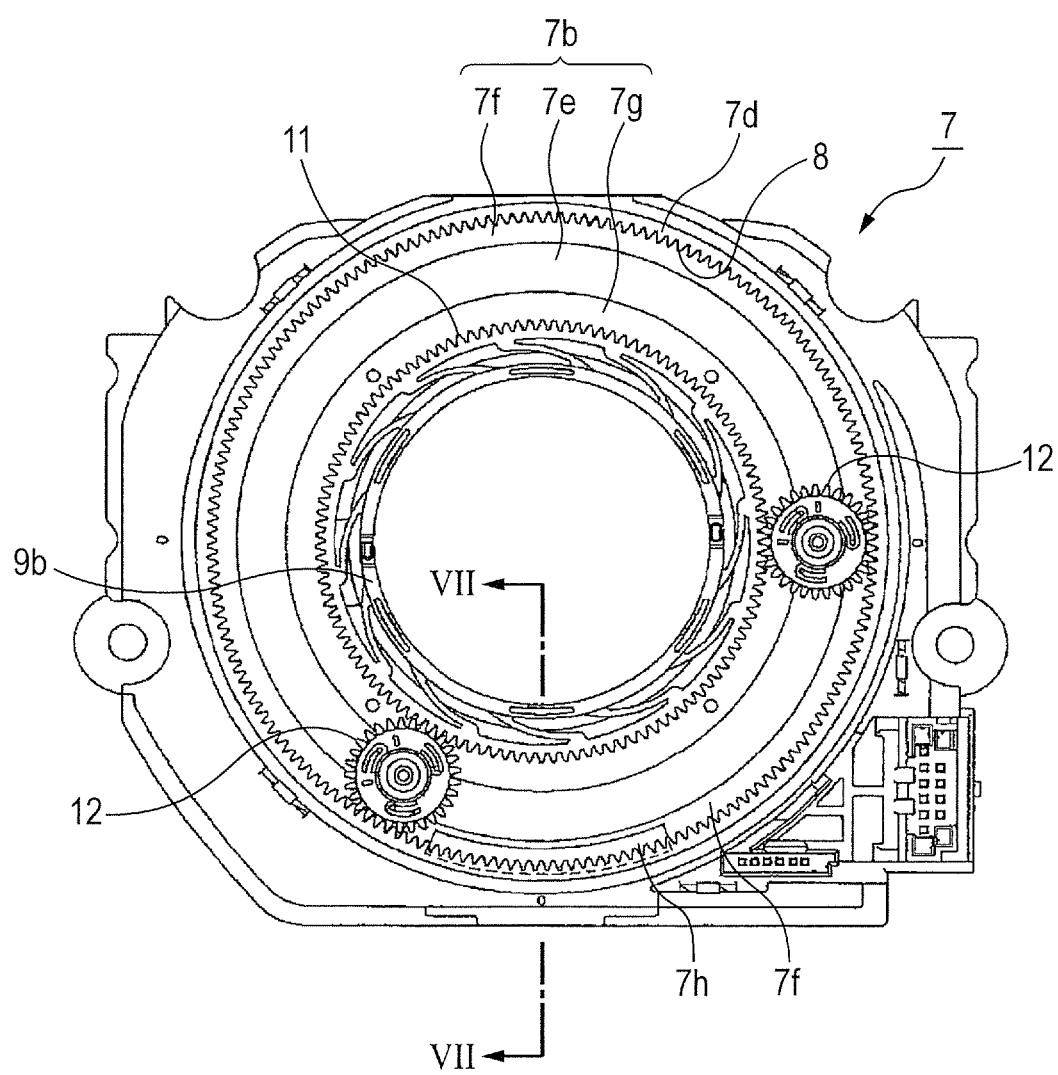
FIG. 6 is an explanatory view showing a state in which planetary gears of the rotary connector mesh with each gear according to an embodiment of the disclosure.
Figure 7:
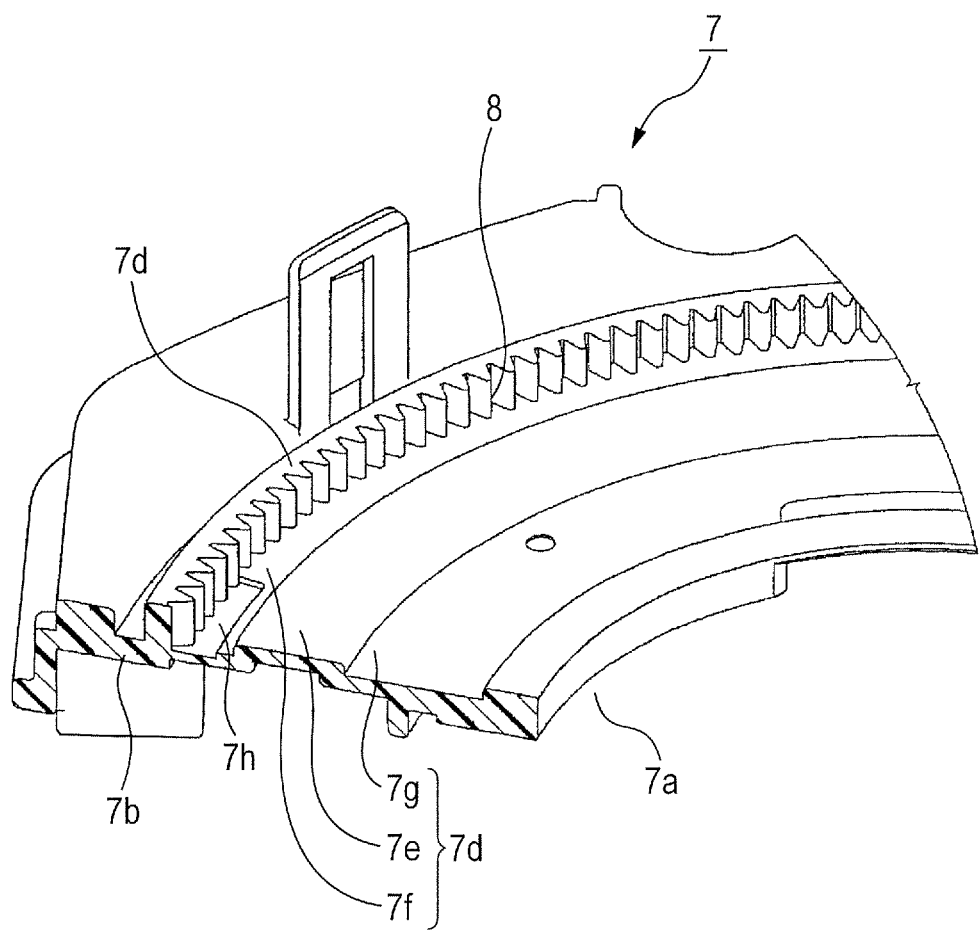
FIG. 7 is a cross-sectional perspective view taken along line VII-VII of FIG. 6.

As shown in FIG. 4, a bottom plate 7b that may include a center hole 7a and a connector cover 7c that may protrude downward from a corner portion of the bottom plate 7b are formed on the lower case 7. Accordingly, when the upper and lower cases 6 and 7 are integrated with each other, the stationary-side connecting portion 6c may be connected to the connector cover 7c (see FIG. 2). Further, a stepped wall 7d, which may protrude upward so as to surround the outer edge portion of the bottom plate 7b, may be formed on the lower case 7 and an internal gear 8 may be provided on the stepped wall 7d (see FIG. 7). As shown in FIG. 6, an annular protrusion 7e may be formed on the bottom plate 7b inside the internal gear 8 in a radial direction. The internal gear 8 and the annular protrusion 7e may be formed concentrically with the center hole 7a. A region, which is formed between the outer peripheral wall surface of the annular protrusion 7e and the internal gear 8, may form a first annular recessed groove 7f, and a hollow portion 7h having a large depth may be further formed in the first annular recessed groove 7f. As shown in FIG. 7, an inner wall of the hollow portion 7h corresponding to the outer periphery may be recessed from the lower end portion of the internal gear 8 to the outside in the radial direction, and the first annular recessed groove 7f and the hollow portion 7h form a foreign matter storage recess. Meanwhile, a region, which may be formed between the inner peripheral wall surface of the annular protrusion 7e and a sun gear 11, may form a second annular recessed groove 7g (recess), and the first annular recessed groove 7f and the second annular recessed groove 7g may be formed on both sides of the annular protrusion 7e.

Figure 3:
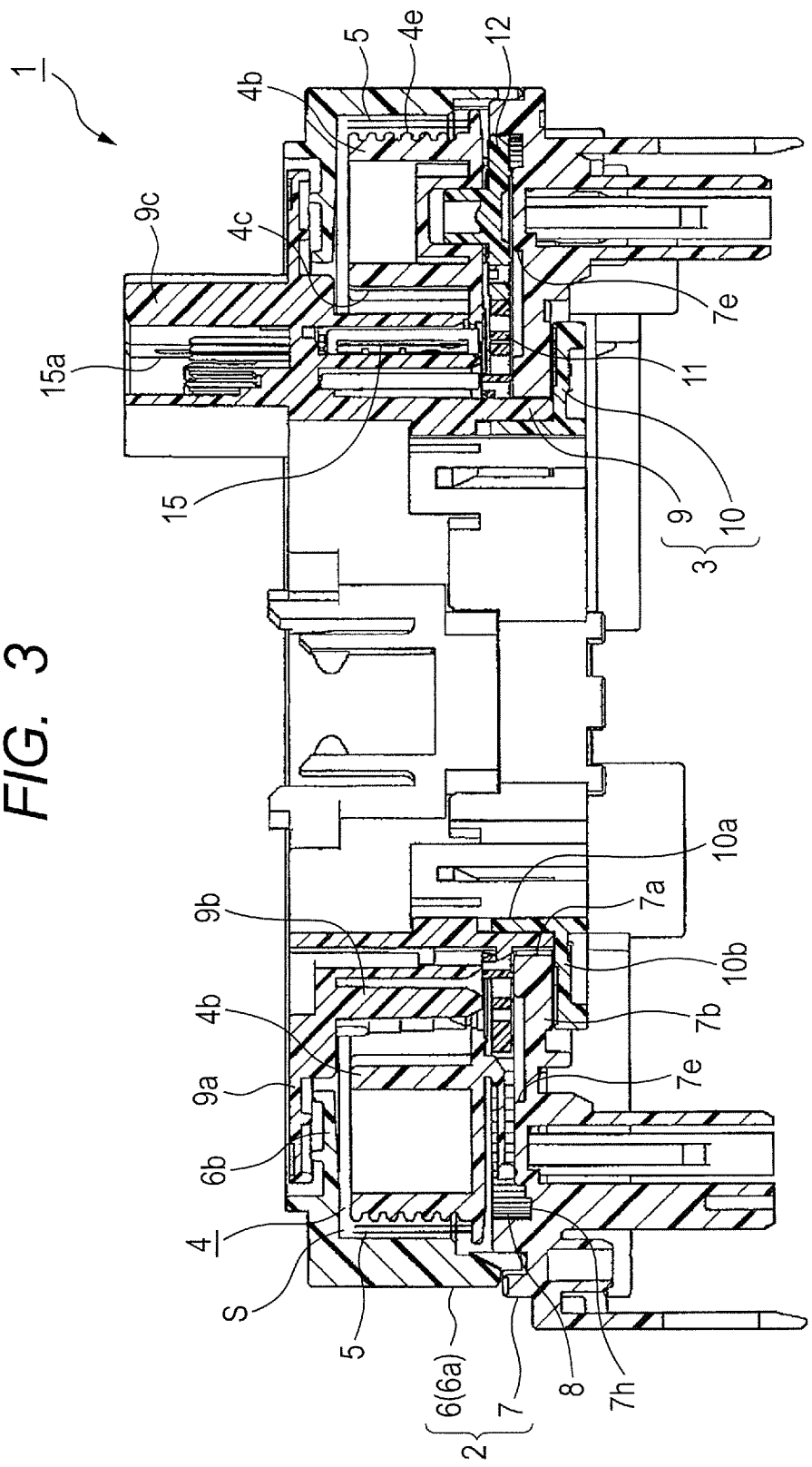
FIG. 3 is a longitudinal sectional view of the rotary connector according to an embodiment of the disclosure.

As shown in FIG. 3, the movable-side housing 3 may include upper and lower rotors 9 and 10 made of a synthetic resin, and both the rotors 9 and 10 may be connected to and integrated with each other by snap-fitting. A top plate portion 9a that overlaps the ring portion 6b of the upper case 6, an inner cylindrical body 9b that protrudes downward from the inner peripheral edge of the top plate portion 9a, and a movable-side connecting portion 9c that protrudes upward from the upper surface of the top plate portion 9a may be formed integrally with the upper rotor 9. A terminal group 15a of the joint portions 15, which electrically connect the inner peripheral ends of the flat cables 5 to the steering wheel H, may be led to the movable-side connecting portion 9c.

As shown in FIGS. 3 and 4, a connecting cylinder portion 10a into which the steering shaft SH is inserted and a ring-shaped flange portion 10b that extends outward from the lower end of the connecting cylinder portion 10a may be formed on the lower rotor 10. The connecting cylinder portion 10a may be inserted into the center hole 7a from below and may be engaged with the inner cylindrical body 9b, so that the upper and lower rotors 9 and 10 are snap-fitted to each other. Accordingly, since the top plate portion 9a of the upper rotor 9 slidably faces the upper surface of the ring portion 6b and the flange portion 10b of the lower rotor 10 slidably faces the lower surface of the bottom plate 7b, the position of the movable-side housing 3 (the upper and lower rotors 9 and 10) may be regulated in the direction of an axis and the movable-side housing 3 is rotatably connected to the stationary-side housing 2. Further, in this state, the outer cylindrical body 6a and the inner cylindrical body 9b face each other in the radial direction and the ring portion 6b and the top plate portion 9a face the bottom plate 7b in the direction of the axis. Accordingly, a receiving space S in which the flat cables 5 are received may be defined between both the housings 2 and 3 by these members (see FIG. 3).

The sun gear 11 may be fixed to the lower end portion of the inner cylindrical body 9b of the upper rotor 9, and a pair of planetary gears 12 may mesh with the internal gear 8 provided on the lower case 7 and the sun gear 11 as shown in FIG. 6. The internal gear 8 and the sun gear 11 may face each other with the annular protrusion 7e of the bottom plate 7b interposed therebetween, and the lower surfaces of the planetary gears 12 may contact with the annular protrusion 7e. Accordingly, when the movable-side housing 3 rotates relative to the stationary-side housing 2, the planetary gears 12 meshing with both the gears 8 and 11 may revolve while rotating on the annular protrusion 7e. Meanwhile, the number of the planetary gears 12 is not limited to two, and one or three or more planetary gears 12 may mesh with both the gears 8 and 11.

Figure 8:
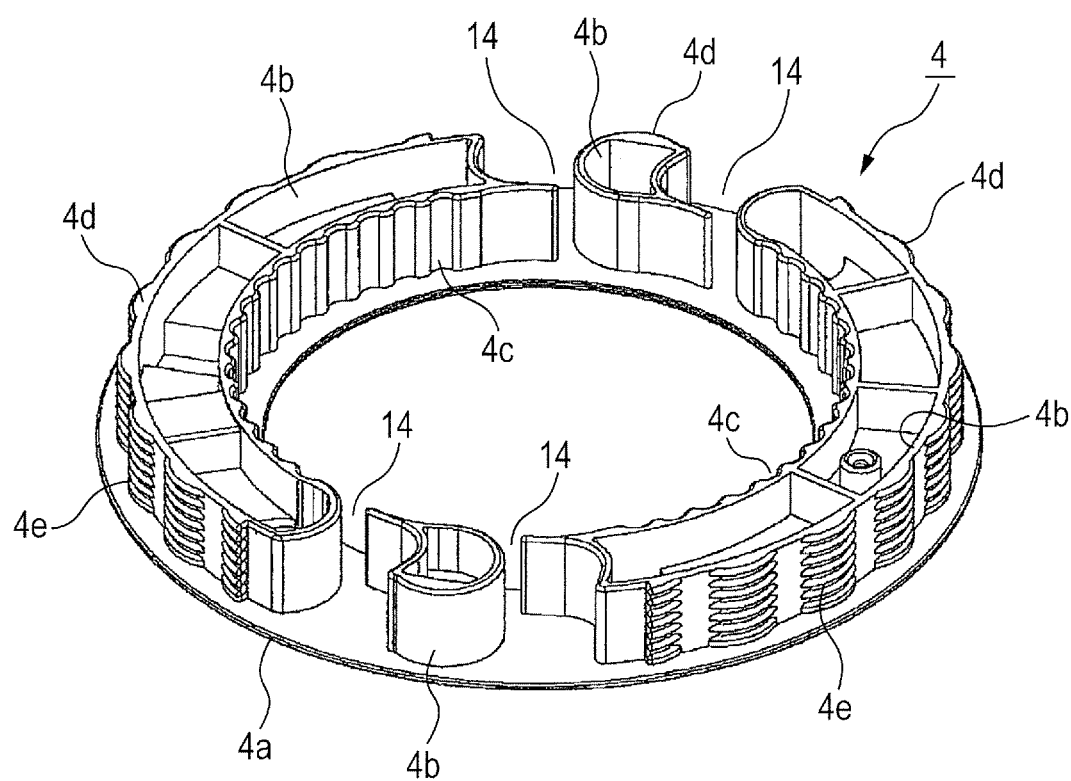
FIG. 8 is a perspective view of a moving body of the rotary connector according to an embodiment of the disclosure.

The moving body 4 that is formed of a molded product made of a synthetic resin and the plurality of flat cables 5 may be received in the receiving space S, and the moving body 4 may be formed so that a plurality of regulating walls 4b are erected on a ring-shaped flat plate portion 4a as shown in FIG. 8. The above-mentioned planetary gears 12 may be supported by the lower surface of the flat plate portion 4a. Accordingly, when the planetary gears 12 rotate and revolve, the moving body 4 turns in the receiving space S. Openings 14 may be secured between the four regulating walls 4b, respectively. In the case of this embodiment, two regulating walls 4b having a sufficiently long circumferential length and two regulating walls 4b having a significantly shorter length than the circumferential lengths of the two regulating walls 4b may be alternately erected on the flat plate portion 4a, and four openings 14 having the same size may be provided between the respective regulating walls 4b. Meanwhile, the wall surfaces, which are positioned on the inner and outer sides in the radial direction and extend in the circumferential direction, of the four regulating walls 4b of the moving body 4 may be formed to be concentric with the center of the ring-shaped flat plate portion 4a of the moving body 4. Further, when the moving body 4 is assembled with the rotary connector 1, the center of the flat plate portion 4a of the moving body 4 corresponds to the center of the center hole 7a of the bottom plate 7b.

Figure 5:
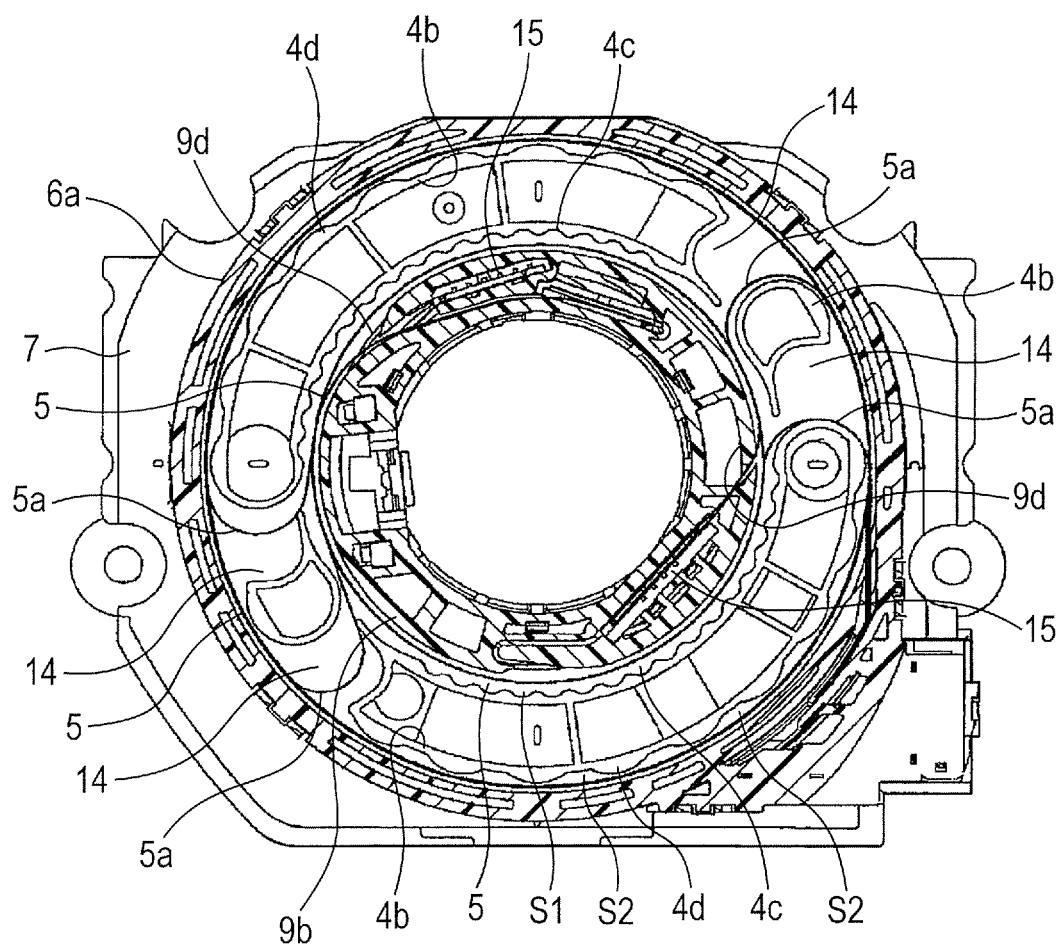
FIG. 5 is a cross-sectional view showing the internal structure of the rotary connector according to an embodiment of the disclosure.

As shown in FIG. 5, a plurality of groove portions 4c may be formed on the inner peripheral wall surfaces (inner peripheral surfaces) of the two long regulating walls 4b. These groove portions 4c are grooves that extend in a direction perpendicular to the surface of the flat plate portion 4a and have a U-shaped cross-section. Since the respective groove portions 4c are continued so that irregularities are repeated along the inner peripheral surfaces of the regulating walls 4b, a gap S1 of which the outer peripheral side is formed in a wavy shape is secured between the inner peripheral surfaces of the regulating wall 4b and the outer peripheral surface of the inner cylindrical body 9b. That is, in a plan view of the moving body 4 that is seen from above, the inner peripheral surfaces of the regulating walls 4b may be formed in a wavy shape where recessed portions (hollows of the groove portions 4c) and protruding portions (portions between the adjacent groove portions 4c) are alternately repeated in the circumferential direction, and the bottoms of the recessed portions and the apexes of the protruding portions are smoothly rounded.

Figure 9:
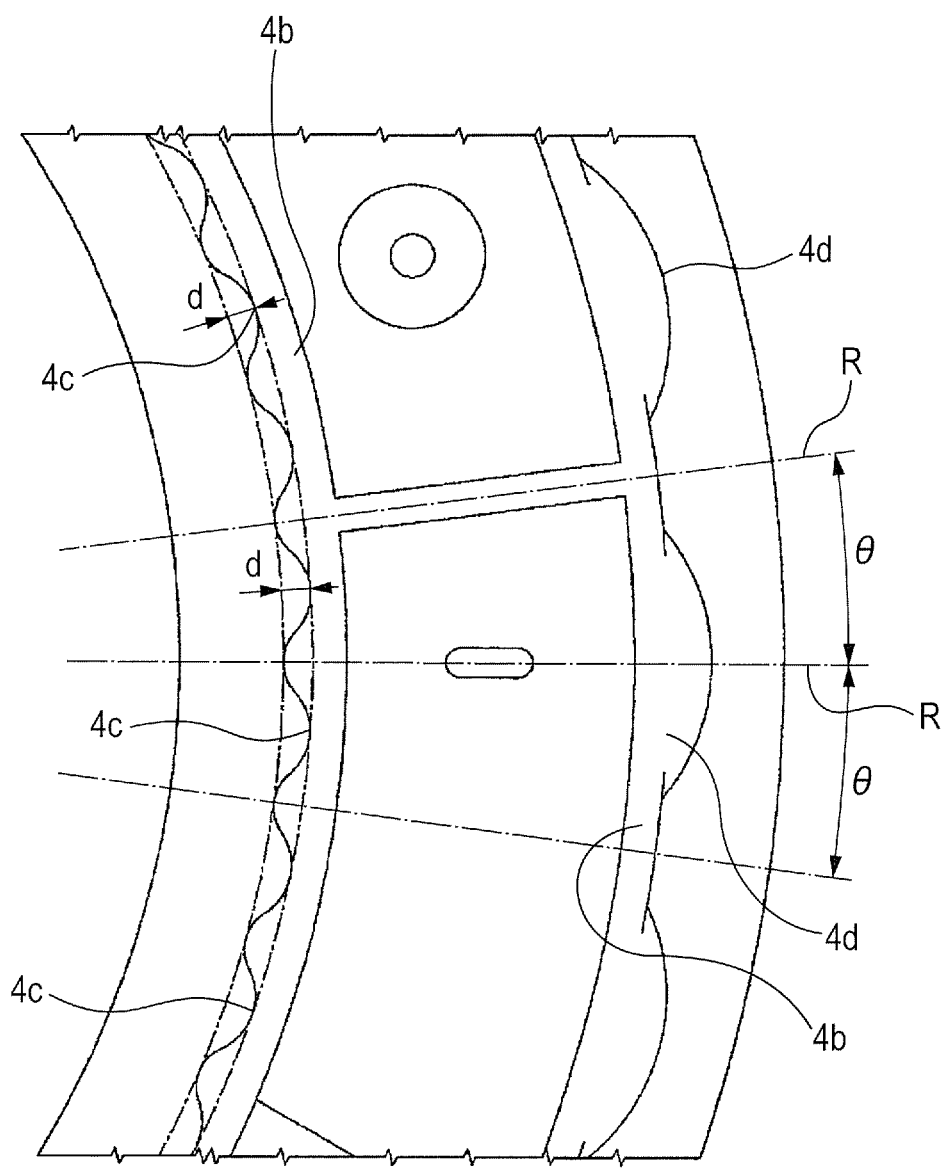
FIG. 9 is a view illustrating a relationship between the depth and width of a groove portion formed on the moving body according to an embodiment of the disclosure.

When the depth of the groove portion 4c is denoted by "d" and a central angle corresponding to the circumferential length of the groove portion 4c (an angle formed by a pair of radial lines R that are directed to bottoms of the adjacent groove portions 4c from the center of the regulating wall 4b) is denoted by θ as shown in FIG. 9, the "d" and the angle θ are set to satisfy "0.5 mm≤d≤2.0 mm" and "5°≤θ≤30°". According to this structure, it is possible to simplify the structure of the moving body 4 in the form of an integrated part such as a resin molded product and to reduce noise since rollers are not needed. Further, since a coefficient of friction between the inner peripheral surfaces of the regulating walls 4b and the flat cable 5 is reduced, it is possible to smoothly feed the flat cable 5 to the outer cylindrical body 6a. Meanwhile, when the "d" and the angle θ are set to satisfy "0.5 mm≤d≤1.5 mm" and "7.5°≤θ≤15°", a coefficient of friction between the inner peripheral surfaces of the regulating walls 4b and the flat cable 5 is further reduced. For this reason, the "d" and the angle θ may be set to satisfy "0.5 mm≤d≤1.5 mm" and "7.5°≤θ≤15°". Furthermore, according to this structure, since it is difficult for the flat cable 5 to come into close contact with the regulating walls 4b even if a lubricant such as grease adheres between the flat cable 5 and the regulating walls 4b, it is possible to avoid the close contact of the flat cable 5 with the regulating walls 4b. Accordingly, it is also possible to obtain an effect of preventing the flat cable 5 from buckling when the flat cable 5 is fed to the outer cylindrical body 6a. Here, when the "d" is smaller than 0.5 mm, it is not possible to sufficiently reduce a coefficient of friction between the moving body 4 and the flat cable 5. In contrast, when the "d" is larger than 2.0 mm, the groove portion 4c is excessively deep. Accordingly, there is a manufacturing problem in that it is difficult to mold the regulating wall 4b. Moreover, when the angle θ is smaller than 5°, the groove portion 4c is excessively fine. Accordingly, it is difficult to mold the regulating wall 4b. In contrast, when the angle θ is larger than 30°, the groove portion 4c is excessively coarse. Accordingly, it is not possible to sufficiently reduce a coefficient of friction between the moving body 4 and the flat cable 5. Meanwhile, in the case of this embodiment, a plurality of groove portions 4c, of which a depth is 1 mm and a central angle corresponding to a width is 7.5°, are formed on the inner peripheral surfaces of the two regulating walls 4b that are long in the circumferential direction.

Further, since a plurality of protrusions 4d are formed on the outer peripheral wall surfaces (outer peripheral surfaces) of the two long regulating walls 4b among the four long and short regulating walls 4b that are erected on the flat plate portion 4a, a gap S2 of which the inner peripheral side is formed in a wavy shape may be secured between the outer peripheral surfaces of the regulating wall 4b and the inner peripheral surface of the outer cylindrical body 6a. That is, in a plan view of the moving body 4 that is seen from above, the outer peripheral surfaces of the regulating walls 4b are formed in a wavy shape where the protrusions 4d and recessed portions are alternately repeated (see FIG. 5). Accordingly, a polygonal shape may be formed when the apexes of the respective protrusions 4d are connected to each other. In such an embodiment, a total of eighteen protrusions 4d are formed on the outer peripheral surfaces of the two long regulating walls 4b. Accordingly, there are eighteen sides in a shape that is formed when the apexes of the respective protrusions 4d are connected to each other. Recessed grooves 4e (see FIG. 3), which may extend in the circumferential direction, may be formed on the outer peripheral surface of each of the protrusions 4d, and a plurality of recessed grooves 4e are formed so that irregularities are repeated on one protrusion 4d in the direction of the axis (see FIG. 8).

The flat cable 5 is a strip-shaped body in which a conductor is supported on an insulating film such as PET, and an insulating film having a small thickness (so-called low stiffness) (a thickness of 135 μm) may be used. A plurality of flat cables 5 may be received in the receiving space S so that the winding directions of the flat cables 5 are reversed at the middle portions of the flat cables 5. In such an embodiment, four flat cables 5 may be received in the receiving space S together with the moving body 4. As shown in FIG. 4, the outer end portions of the flat cables 5 may be connected to the joint portions 15 fixed to the outer cylindrical body 6a and may be electrically led to the outside through a cable leading portion 6d that is formed in the outer cylindrical body 6a (see FIG. 5). Further, the inner end portions of the flat cables 5 may be connected to the joint portions 15 and may be electrically led to the outside through a cable leading portion 9d that is formed in the inner cylindrical body 9b. Meanwhile, as shown in FIG. 5, after being wound counterclockwise on the outer peripheral surface of the inner cylindrical body 9b in the gap S1, each flat cable 5, which is led to the gap S1 from the cable leading portion 9d, may be inverted in a U shape in the opening 14 of the moving body 4 (hereinafter, this is referred to as an inverted portion 5a) and is fed to the gap S2. Moreover, after being wound clockwise on the inner peripheral surface of the outer cylindrical body 6a in the gap S2, each flat cable 5 is received in the receiving space S so as to reach the joint portion 15, which is fixed to the outer cylindrical body 6a, from the cable leading portion 6d.

The rotary connector 1 having this structure is assembled with the steering device so as to be in a backward inclined posture as described above. However, when the stationary-side housing 2 is fixed to the mounting surface of the steering column C as shown in FIG. 1, the stationary-side housing 2 may be mounted so that the hollow portion 7h formed on the bottom plate 7b of the lower case 7 may face directly below in a vertical direction. Further, when the movable-side housing 3 rotates in any one direction of a normal direction and a reverse direction while interlocking with the steering wheel H during use, each of the flat cables 5 may be fed from the inner cylindrical body 9b so as to be rewound on the outer cylindrical body 6a or, conversely, may be fed from the outer cylindrical body 6a so as to be tightly wound on the inner cylindrical body 9b according to the rotation direction of the movable-side housing 3. Accordingly, each of the inverted portions 5a may be moved in the same direction as the direction of the movable-side housing 3 by a rotation angle smaller than the rotation angle of the movable-side housing 3. Furthermore, since the sun gear 11 rotates relative to the internal gear 8 simultaneously with this, the planetary gears 12 meshing with both the gears 8 and 11 may rotate and revolve on the annular protrusion 7e of the bottom plate 7b and the moving body 4 supporting the planetary gears 12 turns in the receiving space S. At that time, since the gear ratios of the internal gear 8, the sun gear 11, and the planetary gears 12 are set so that the moving speeds and moving directions of the inverted portions 5a of the flat cables 5 are the same as the moving speeds and moving directions of the openings 14 of the moving body 4, the four flat cables 5 may be rewound or tightly wound while the movements of the four flat cables 5 in the radial direction are regulated by the regulating walls 4b of the moving body 4. Accordingly, an air bag inflator or the like provided in the steering wheel H may be connected to a controller provided in the steering column C through the flat cables 5 of the rotary connector 1 regardless of the steering angle (rotation angle) of the steering wheel H.

Under this usage condition, a small clearance may be secured at a sliding portion between the ring portion 6b of the stationary-side housing 2 and the top plate portion 9a of the movable-side housing 3. However, when a foreign matter, such as dust or hard sand, enters the receiving space S through this clearance, this foreign matter falls down onto the bottom plate 7b of the lower case 7 and is accumulated in the hollow portion 7h through the first annular recessed groove 7f, which is positioned outside the annular protrusion 7e formed on the bottom plate 7b in the radial direction, due to the vibration of an automobile. As shown in FIG. 7, the inner wall of the hollow portion 7h corresponding to the outer periphery is formed so as to be recessed from the lower end portion of the internal gear 8, which is provided on the stepped wall 7d of the lower case 7, to the outside in the radial direction. Accordingly, a foreign matter, which enters the receiving space S from the outside, is moved to and deposited in the region, which is recessed from the lower end portion of the internal gear 8 to the outside in the radial direction, of the hollow portion 7h. For this reason, the hindrance to the rotation of the planetary gears 12 meshing with the internal gear 8 and the sun gear 11, which is caused when the planetary gears 12 catch a foreign matter such as hard sand of which the particle size is larger than the particle size of, particularly, dust, does not occur and the planetary gears 12 smoothly rotate with the rotation of the movable-side housing 3 and drive the moving body 4. Accordingly, the steering wheel H can be rotated without being affected by a foreign matter.

Moreover, since the first annular recessed groove 7f is formed in the region that is formed between the outer peripheral wall surface of the annular protrusion 7e and the internal gear 8 and both the first annular recessed groove 7f and the hollow portion 7h form a recess, the region of the recess in which a foreign matter entering the receiving space S can be accumulated is enlarged. Accordingly, it is possible to further reduce a possibility that the hindrance to the rotation of the planetary gears 12, which is caused when the planetary gears 12 catch a foreign matter, occurs. In addition, the second annular recessed groove 7g, which is continued in the circumferential direction, is formed in the region, which is formed between the inner peripheral wall surface of the annular protrusion 7e and the sun gear 11, on the bottom plate 7b. For this reason, the region in which a foreign matter can be accumulated is enlarged not only on the outside of the annular protrusion 7e in the radial direction but also on the inside of the annular protrusion 7e in the radial direction. Accordingly, even though a foreign matter entering the receiving space S adheres to the surface of the annular protrusion 7e for some reasons and this foreign matter is pushed back inward in the radial direction due to the movement of the planetary gears 12 rotating and revolving on the annular protrusion 7e, it is possible to make the foreign matter fall down onto the second annular recessed groove 7g in front of the sun gear 11 and to accumulate the foreign matter in the second annular recessed groove 7g. Therefore, a concern about the hindrance to the free rotation of the steering wheel H, which is caused by a foreign matter, is further reduced.

Further, in the rotary connector 1 according to such an embodiment, the plurality of the regulating walls 4b, which extend in the circumferential direction with the plurality of openings 14 interposed therebetween, respectively, may be erected on the moving body 4, which may turn in the receiving space S with the rotation and revolution of the planetary gears 12, and the inverted portions 5a may pass through the openings 14 so that the movements of the flat cables 5 in the radial direction are regulated. Furthermore, the plurality of groove portions 4c may be successively formed along the circumferential direction on the inner peripheral surfaces of the regulating walls 4b, and the depths and widths (circumferential lengths) of these groove portions 4c are specified.

Moreover, since the plurality of (four) flat cables 5 are received in the receiving space S and the plurality of (four) openings 14 through which the inverted portions 5a of the respective flat cables 5 individually pass may be formed in the moving body 4, it is possible to realize the rotary connector 1 that uses two or more flat cables 5. However, the number of the openings 14 formed in the moving body 4 may not be necessarily the same as the number of the flat cables 5 to be used. For example, if four openings 14 are formed in the moving body 4 in advance and only two openings 14 of the four openings 14 are used as spaces in which the inverted portions 5a are disposed, it is possible to realize a rotary connector 1 of which the number of flat cables 5 varies by using a common moving body 4.

As described above, in the rotary connector 1 according to this embodiment, the annular protrusion 7e that comes into contact with the lower surfaces of the planetary gears 12 and a recess (hollow portion 7h) that is positioned outside the annular protrusion 7e in the radial direction are formed on the bottom plate 7b of the lower case 7 that is a component of the stationary-side housing 2, and the hollow portion 7h is positioned at least directly below in a vertical direction when the stationary-side housing 2 is mounted on the steering column C that is an installation portion of a vehicle. Accordingly, a foreign matter such as hard sand, which enters the receiving space S from the outside, falls down onto the bottom plate 7b of the stationary-side housing 2 and is accumulated in the hollow portion 7h due to the vibration of an automobile. Therefore, since the hindrance to the rotation of the planetary gears 12 meshing with the internal gear 8 and the sun gear 11, which is caused when the planetary gears 12 catch a foreign matter, does not occur and the planetary gears 12 smoothly rotate with the rotation of the movable-side housing 3 and drive the moving body 4, the steering wheel H can be rotated without being affected by a foreign matter.

Further, since the first annular recessed groove 7f, which may be continued along the outer peripheral edge of the annular protrusion 7e, is formed on the bottom plate 7b and both the first annular recessed groove 7f and the hollow portion 7h form a foreign matter storage recess in the rotary connector 1 according to this embodiment, the region of the recess in which a foreign matter entering the receiving space S can be accumulated is enlarged. Accordingly, it is possible to further reduce a possibility that the hindrance to the rotation of the planetary gears 12, which is caused when the planetary gears 12 catch a foreign matter, occurs. In addition, since the second annular recessed groove 7g, which is continued along the inner peripheral edge of the annular protrusion 7e, is formed on the bottom plate 7b, the region in which a foreign matter can be accumulated is enlarged not only on the outside of the annular protrusion 7e in the radial direction but also on the inside of the annular protrusion 7e in the radial direction. Accordingly, even though a foreign matter entering the receiving space S adheres to the surface of the annular protrusion 7e for some reasons and this foreign matter is pushed back inward in the radial direction due to the movement of the planetary gears 12 rotating and revolving on the annular protrusion 7e, it is possible to make the foreign matter fall down onto the second annular recessed groove 7g in front of the sun gear 11 and to accumulate the foreign matter in the second annular recessed groove 7g. Therefore, a concern about the hindrance to the free rotation of the steering wheel H, which is caused by a foreign matter, is further reduced.

Meanwhile, a case in which the first annular recessed groove 7f continued along the outer peripheral edge of the annular protrusion 7e and the hollow portion 7h formed outside the first annular recessed groove 7f in the radial direction form a recess has been described in the above-mentioned embodiment, but only the first annular recessed groove 7f may form a recess. That is, since the planetary gears 12 rotate and revolve on the annular protrusion 7e, the planetary gears 12 mesh with the internal gear 8 at a position higher than the bottom of the first annular recessed groove 7f. Accordingly, the planetary gears 12 can mesh with the internal gear 8 without being affected by a foreign matter such as hard sand accumulated on the bottom of the first annular recessed groove 7f.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A rotary connector comprising:
    a stationary-side housing where an outer cylindrical body is erected from an outer peripheral edge of a bottom plate;
    a movable-side housing that includes an inner cylindrical body facing the outer cylindrical body and is disposed coaxially with the stationary-side housing;
    flat cables which are received in a receiving space defined between the outer cylindrical body and the inner cylindrical body so that winding directions of the flat cables are reversed at middle portions of the flat cables, and of which both ends are fixed to the stationary-side housing and the movable-side housing, respectively; and
    a moving body that is turnably disposed in the receiving space and includes openings through which inverted portions of the flat cables pass,
    wherein planetary gears supported on a lower surface of the moving body mesh with an internal gear that is provided in the stationary-side housing and a sun gear that is provided in the movable-side housing, and
    the bottom plate of the stationary-side housing is provided with an annular protrusion that comes into contact with lower surfaces of the planetary gears and a recess that is positioned outside the annular protrusion in a radial direction, and the recess is positioned at least directly below in a vertical direction when the stationary-side housing is mounted on an installation portion of a vehicle, and
    wherein the recess includes a first annular recessed groove that is continued along an outer peripheral edge of the annular protrusion and a hollow portion that overlaps the internal gear on the outside of the first annular recessed groove in the radial direction.

2. The rotary connector according to claim 1, wherein the bottom plate is provided with a second annular recessed groove that is continued along an inner peripheral edge of the annular protrusion.

* * * * *